May 27, 1941.   J. L. HEROLD ET AL   2,243,313
LOADING DEVICE
Filed June 28, 1938   5 Sheets-Sheet 1
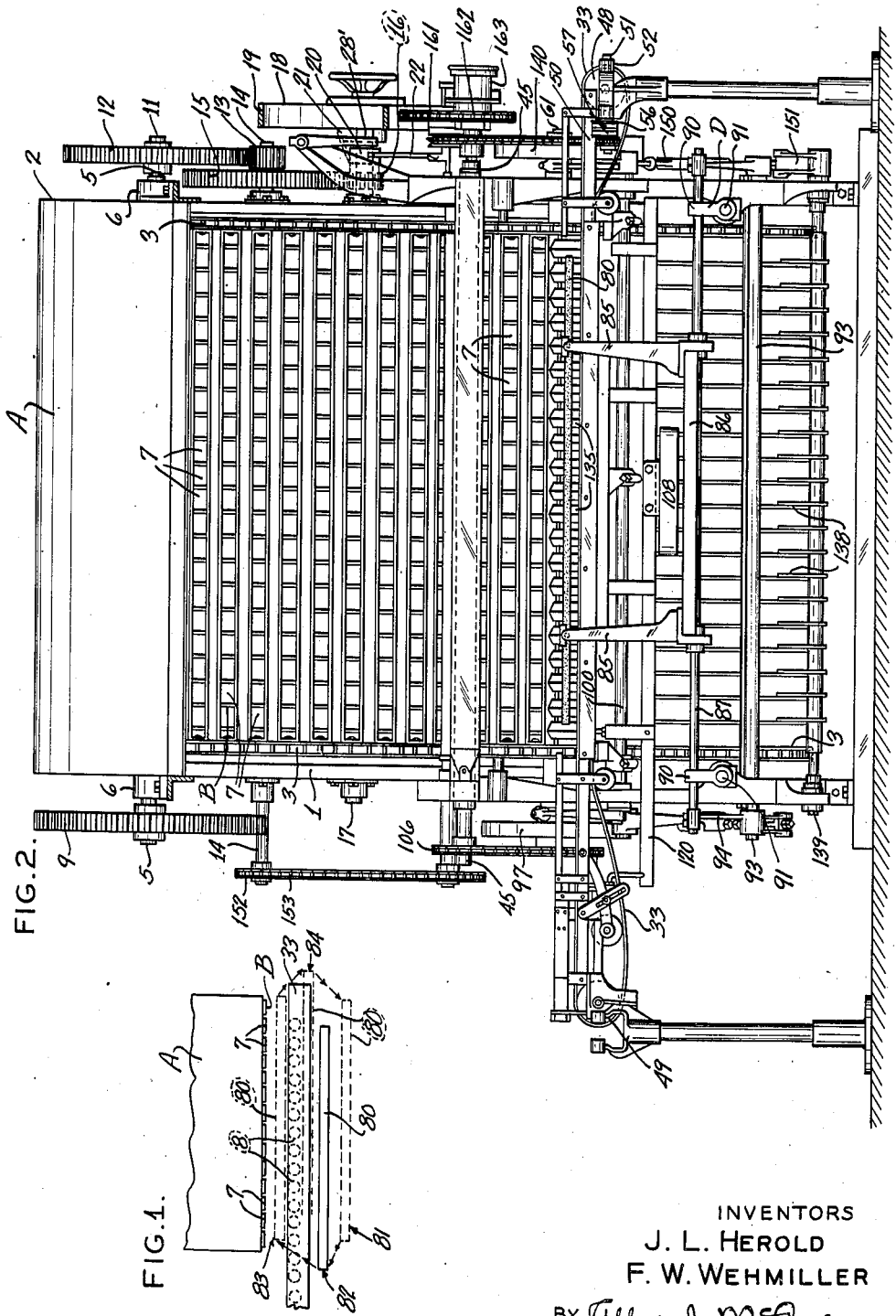
INVENTORS
J. L. HEROLD
F. W. WEHMILLER
BY Albert J. McCauley
ATTORNEY May 27, 1941.                J. L. HEROLD ET AL                    2,243,313
                                  LOADING DEVICE
                              Filed June 28, 1938              5 Sheets-Sheet 2
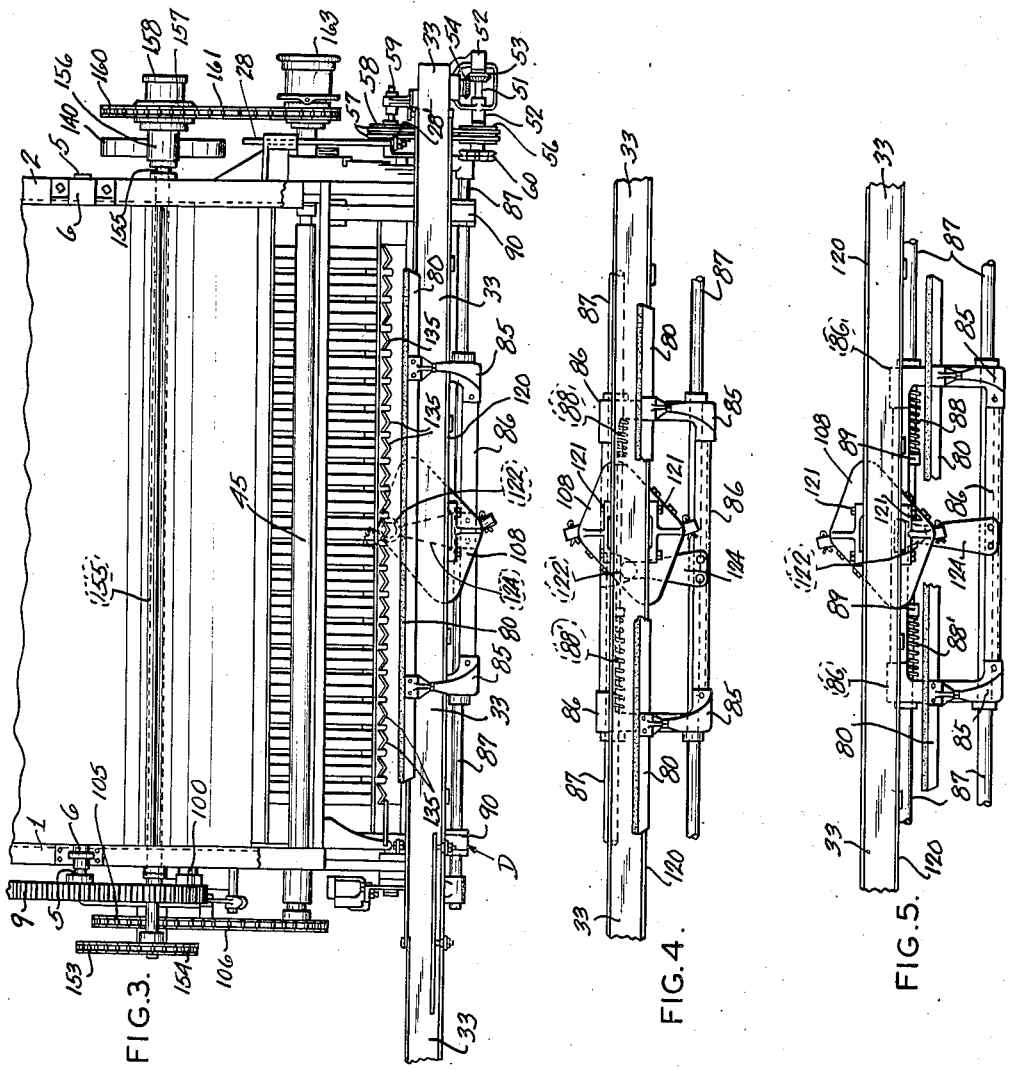
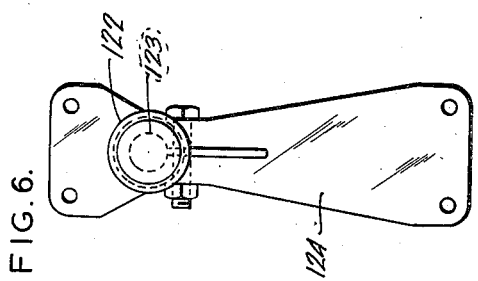
INVENTORS
J. L. HEROLD
F. W. WEHMILLER
BY Albert J. McCauley
ATTORNEY May 27, 1941.   J. L. HEROLD ET AL   2,243,313
LOADING DEVICE
Filed June 28, 1938   5 Sheets-Sheet 3

INVENTORS
J. L. HEROLD
F. W. WEHMILLER
BY Albert J. McCauley
ATTORNEY

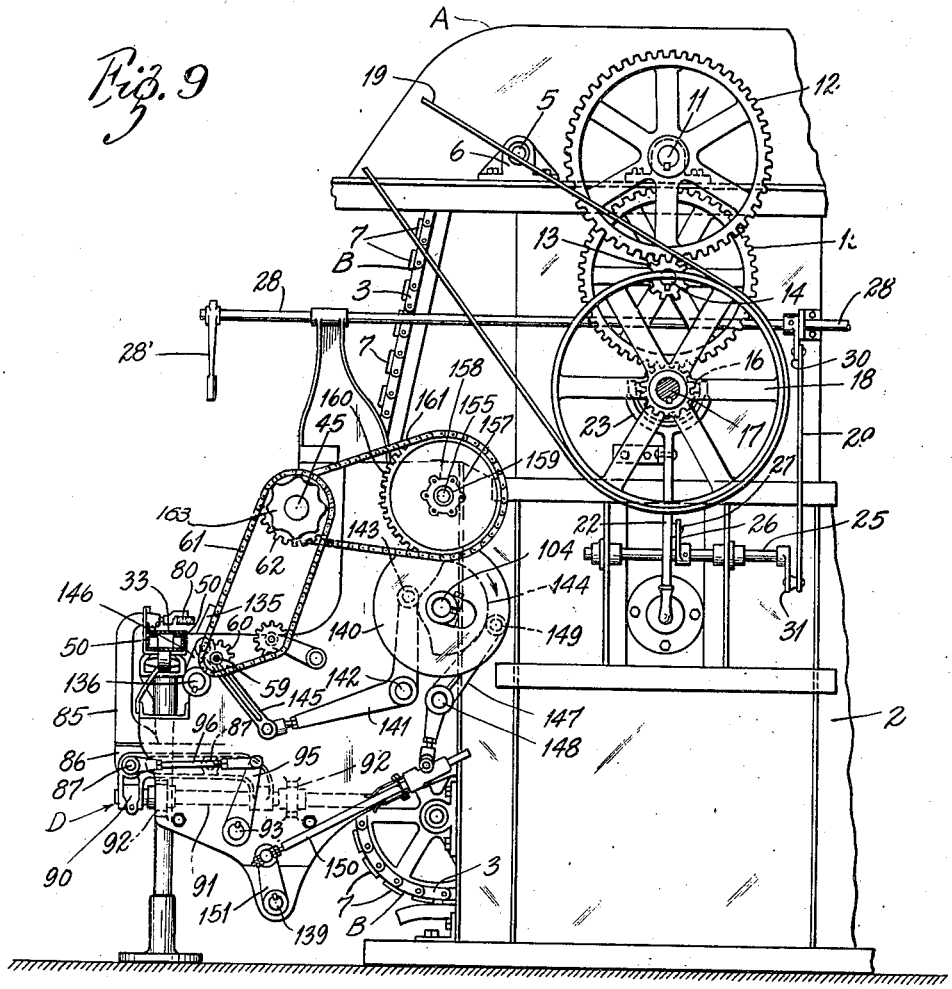

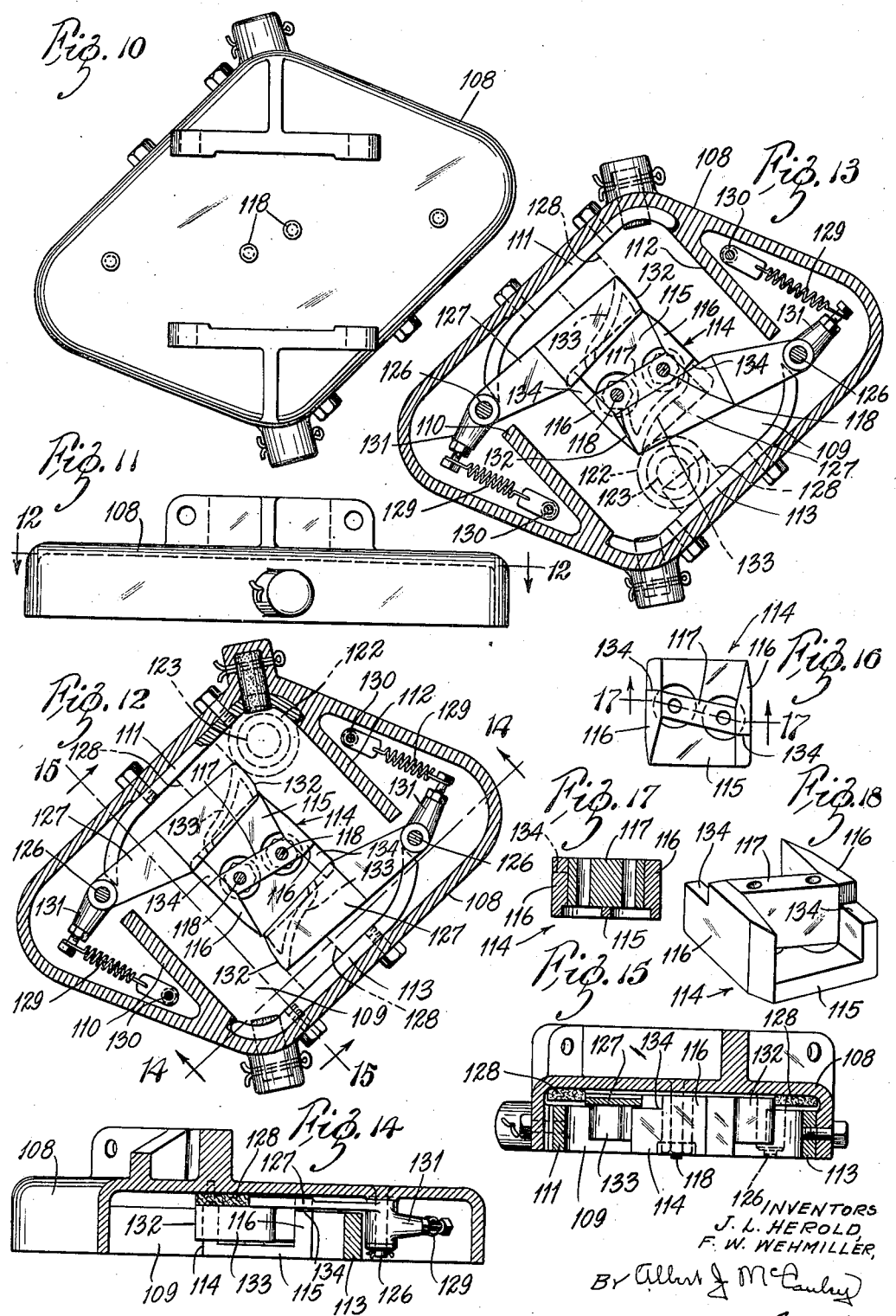

Patented May 27, 1941

2,243,313

UNITED STATES PATENT OFFICE 2,243,313

LOADING DEVICE

James L. Herold, St. Louis, and Frederick W. Wehmiller, Ladue, Mo., assignors to Barry-Wehmiller Machinery Company, St. Louis, Mo., a corporation of Missouri Application June 28, 1938, Serial No. 216,316

5 Claims. (Cl. 198—31)

This invention relates to loading devices and more particularly to an apparatus for transferring articles to a machine having an entrance for a row of articles.

Various kinds of machines, including pasteurizers for bottled liquids, as well as other machines for handling bottles or other articles, are provided with an endless carrier having relatively wide rows of separated receptacles movable to transmit rows of articles through the machine. It has long been a problem to accurately and rapidly deliver long rows of spaced articles to the separated receptacles of such machines.

An object of this invention is to provide a means for continuously supplying properly spaced articles adjacent to the entrance of a machine, and transmitting a moving row of said articles into the machine without interrupting the continuity of the article supply or the desired spacing of the articles in the row.

With the foregoing and other objects in view, the invention comprises the novel construction, combination and arrangement of parts hereinafter more specifically described and shown in the accompanying drawings, which illustrate one form of the invention. However, it is to be understood that the invention extends to changes, variations and modifications within the scope of the claims hereunto appended.

Fig. 1 is a diagrammatical plan view showing a traveling conveyor on which articles are spaced in accordance with the spacing of receptacles adjacent to the conveyor, and also showing an elongated pusher movable in oblique paths to push the spaced articles from the moving conveyor.

Fig. 2 is a front view of the loading apparatus equipped with a single elongated pusher to push the articles from a single traveling conveyor.

Fig. 3 is a top view of the apparatus shown in Fig. 2.

Fig. 4 is a fragmentary top view showing the traveling conveyor, the elongated pusher, and some of the devices for moving said pusher in oblique paths.

Fig. 5 is a view similar to Fig. 4 showing the pusher in a different position.

Fig. 6 is a detail view on a larger scale showing a portion of the supporting frame to which the pusher is secured, and the guide roller on said supporting frame.

Fig. 9 is a view of the right side of the apparatus shown in Fig. 2.

Fig. 10 is an enlarged top view of the stationary cam which guides the pusher in oblique paths.

Fig. 11 is a side view of the cam shown in Fig. 10.

Fig. 12 is a section on the line 12—12 in Fig. 11.

Fig. 13 is a view similar to Fig. 12 showing the guide roller in a different position.

Fig. 14 is a section on the line 14—14 in Fig. 12.

Fig. 15 is a section on the line 15—15 in Fig. 12.

Fig. 16 is a view of the central portions of the cam shown in Figures 10 to 15.

Fig. 17 is a section on the line 17—17 in Fig. 16.

Fig. 18 is a perspective view of the device shown in Figures 16 and 17.

To illustrate the invention, we have shown a loading device for supplying bottles to a pasteurizer. However, the loading device may be employed to supply articles to various other kinds of machines.

Figure 7:
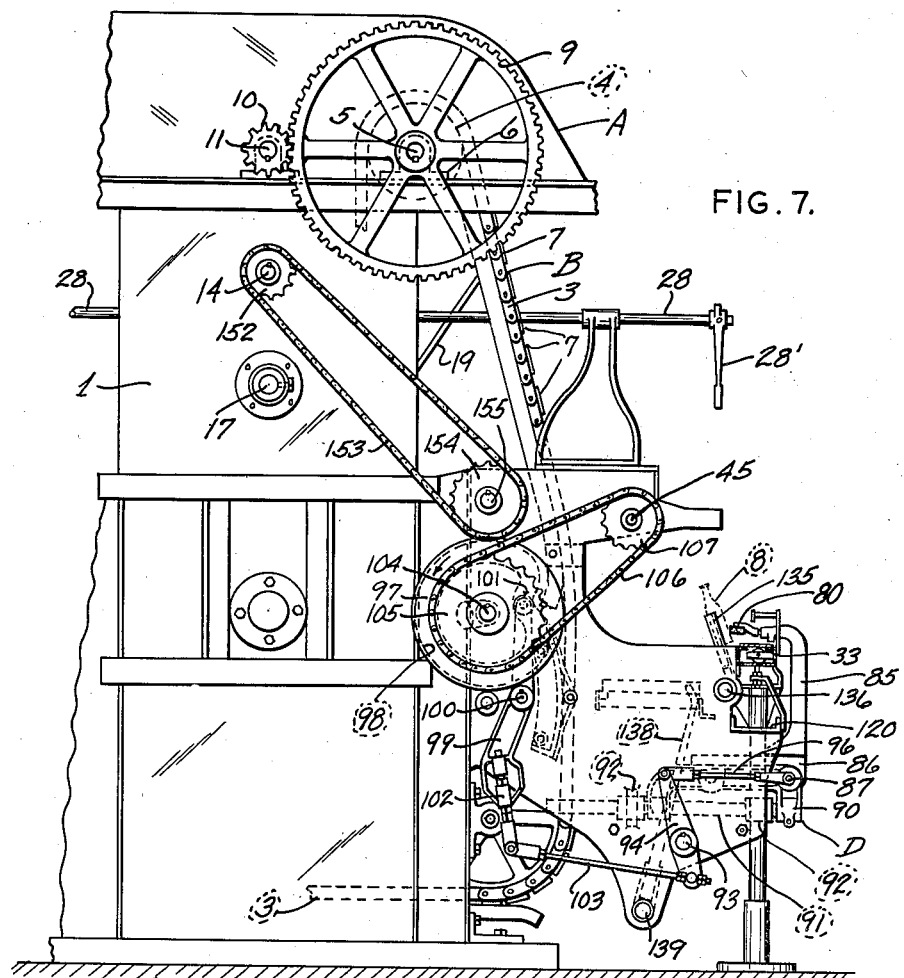
Fig. 7 is a view of the left side of the apparatus shown in Fig. 2.

The pasteurizer, as shown in Figs. 2, 7 and 9, may comprise a housing A having side walls 1 and 2 and a bottle-carrier B including chains 3 which travel over suitable driving wheels 4 on a shaft 5 extending transversely of the pasteurizer. The shaft 5 may be supported in suitable bearings 6 in the side walls 1 and 2 of the housing. The chains 3 are provided with relatively wide rows of separated bottle-receiving receptacles 7 as most clearly shown in Fig. 2 and Fig. 7. The bottle-carrier B is adapted to receive bottles 8 at a loading station (Fig. 7) from which the carrier travels upwardly to the driving wheels 4 and into the pasteurizer.

To provide for the transmission of power to the bottle-carrier B, the shaft 5 carrying the driving wheels 4 is provided with a gear wheel 9 (Fig. 7) meshing with a pinion 10 on one end of a shaft 11 which extends across the pasteurizer. As shown in Figs. 2 and 9, the other end of the shaft 11 is provided with a large gear wheel 12 driven by a pinion 13 on a shaft 14 which extends transversely of the pasteurizer and is supported in suitable bearings in the side walls 1 and 2 of the housing. The shaft 14 is also provided with a gear wheel 15 adapted to mesh with a pinion 16 on a drive shaft 17.

A pulley 18 is mounted on the drive shaft 17 and is driven by a belt 19 from any suitable source of power (not shown). The transmission of power from the pulley 18 to the drive shaft 17 may be controlled by any suitable clutch. As a conventional illustration of the clutch we have shown in Fig. 2, a clutch member 20 slidably secured to said drive shaft and adapted to engage a clutch member 21 on the pulley.

The clutch member 20 is shifted into and out of engagement with the clutch member 21 by means of an arm 22 (Figs. 2 and 9) having an upper bifurcated portion 23 attached to the clutch member 20 and a lower portion pivoted to the side wall 2 of the housing. The arm 22 is actuated by a shaft 25 having a short arm pivotally secured to the arm 22, as shown at 27 in Fig. 9. Motion may be transmitted to the shaft 25 from an operating shaft 28 through a link connection 29 which is pivotally secured to arms 26 30 and 31 on said shafts. The operating shaft 28 extends longitudinally of the machine and is provided at one end with a handle 28' as shown in Fig. 9.

As diagrammatically illustrated in Fig. 1, a traveling conveyor 33 is adapted to continuously deliver spaced bottles 8 adjacent the bottle-carrier B of the pasteurizer.

Figure 8:
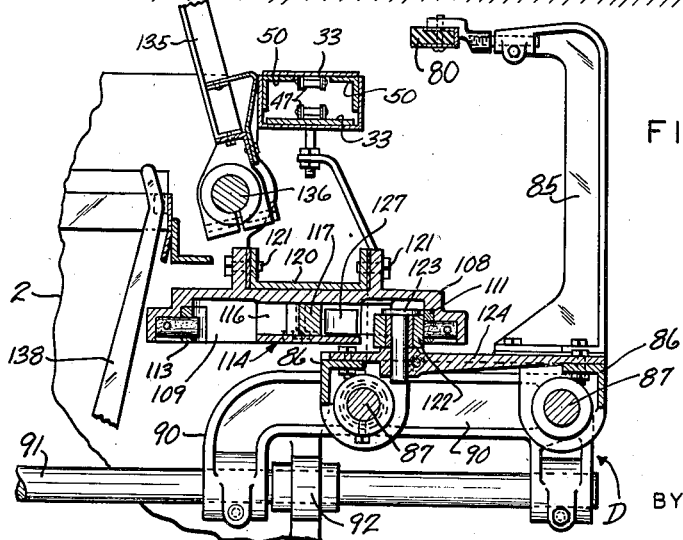
Fig. 8 is an enlarged transverse section showing the conveyor, the pusher at one side of the conveyor, portions of the transferring device at the opposite side of the conveyor, and the stationary cam which guides said pusher in oblique paths.

The constantly running endless conveyor 33 in the form of a belt (Figs. 1, 2 and 3) for feeding bottles adjacent the entrance of the pasteurizer is provided with a chain 47 as most clearly shown in Fig. 8. The conveyor 33 and its chain 47 travel around a driving sprocket wheel 48, and an idler wheel 49 as shown in Fig. 2. The upper portion of the conveyor for delivering the bottles 8 is preferably supported between the wheels 48 and 49 by longitudinal guide bars 50 as shown in Fig. 8.

A suitable means for driving the conveyor 33 is shown in Figs. 2 and 3. It includes a shaft 51 mounted in bearings 52, and a bevel gear 53 near one end of said shaft 51 meshing with a bevel gear 54 on a short shaft secured to the driving wheel 48. The opposite end of the shaft 51 is provided with a pulley 56 driven by belts 57 extending from a pulley 58 on a constantly rotating shaft 59 (Fig. 9), the latter being provided with a sprocket wheel 60 driven by a chain 61 extending from a sprocket 62 on the operating shaft 45, as shown in Figs. 2 and 9.

Attention is now directed to the means for shifting a row of moving bottles from the conveyor 33 without disturbing the spacing of the bottles in the row or interrupting the continuity of the bottle supply.

As diagrammatically indicated by arrows in Fig. 1, an elongated push bar 80 is movable in an approximately diamond-shaped path wherein the push bar 80 travels obliquely forwardly from a starting position 81 to an intermediate position 82 and then obliquely across the conveyor to a position 83 so as to shift a row of articles from the conveyor 33 toward the entrance of the pasteurizer. On the return stroke the push bar 80 travels obliquely over the conveyor 33 from the position 83 to another intermediate position 84 and then to its starting position 81.

During the travel of the push bar 80 in its oblique paths over the conveyor 33, it advances longitudinally of the conveyor at a speed conforming to the speed of said conveyor. The push bar 80 will, therefore, shift an entire row of bottles off of the conveyor 33 without imparting a longitudinal thrust which would disturb the predetermined spacing of the bottles in the row. Moreover, since the push bar 80 advances longitudinally at a speed approximately the same as the speed of the conveyor 33 during both of its oblique movements over the conveyor, the push bar will move away from the oncoming bottles advancing toward the push bar, thereby preventing a displacement of the advancing bottles and an interruption of the continuity of the bottle supply.

We will now refer to the means for actuating the push bar 80 and guiding the same in its diamond-shaped path.

Arms 85 extending upwardly from a support 86 hold the elongated push bar at an elevation higher than the conveyor 33, as shown in Figs. 2, 7, 8 and 9. The support 86 is slidably mounted on guide rods 87 to provide for movement in opposite directions thereon. Compression springs 88 and 88' (Figs. 4 and 5) are interposed between portions of the support 86 and collars 89 fixed to one of the guide rods 87. These springs 88 and 88' are adapted to be alternately compressed during the movements of the support 86 to extreme positions in said opposite directions, and they tend to reverse the movement of said support.

The guide rods 87 extend longitudinally of the conveyor 33 and form part of a reciprocal carriage D which includes frame members 90 secured to said guide rods near their opposite ends. The frame members 90 are also secured to guide rods 91 which extend transversely of the conveyor 33 and are slidably supported in stationary sleeves 92 as shown in Figs. 7, 8 and 9. The carriage D is adapted to reciprocate back and forth between the extreme positions shown in Figs. 7 and 8, and the guide rods 91 form a sliding support for the carriage during such movements.

The means for reciprocating the carriage D includes an oscillatory shaft 93 extending transversely of the machine (Figs. 7 and 9), lever 94 and arm 95 fixed to opposite ends of the shaft 93, and links 96 connecting the arm 95 and one end of the lever 94 to opposite ends of the rear longitudinal guide rod 87 of the carriage. Motion is transmitted to the oscillatory shaft 93 from a constantly rotating cam 97 having a guide passageway 98 (Fig. 7) through a lever 99 pivoted at 100 and having a roller 101 at one end extending into the guide passageway 98 of the cam 97. The other end of the lever 99 is provided with an adjustable extension 102 pivotally connected to one end of a rod 103, the opposite end of said rod being pivoted to the lower portion of the lever 94.

The constantly rotating cam 97, which provides the power for reciprocating the carriage D at predetermined intervals, is fixed near one end of a driven shaft 104 extending across the machine. As shown in Fig. 7 the shaft 104 is provided with a sprocket wheel 105 driven by a chain 106 extending from a sprocket wheel 107 on the operating shaft 45.

During the reciprocatory movements of the carriage D, the support 86, which moves with the carriage and is slidable thereon, is guided in an approximately diamond-shaped path to impart a corresponding motion to the push bar 80. The means for guiding the push bar in said path includes a cam 108 (Figs. 8, and 10 to 18) provided with a diamond-shaped passageway 109 formed by guide walls 110, 111, 112, and 113 and an inner guide member 114 provided with an approximately diamond-shaped bottom wall 115 having oppositely disposed side walls 116 connected by a diagonal web 117 (Figs. 16 to 18). The inner guide member is secured in the cam by studs 118, and the cam 108 is secured to a stationary channel bar 120 as shown at 121 in Fig. 8. A guide roller 122 extends into the passageway 109 and is rotatably mounted on a pin 123 carried by a connecting member 124 (Figs. 6 and 8), said connecting member being secured to the support 86 (Figs. 4 and 5) to guide the support in an approximately diamond-shaped path.

When the carriage D occupies the position illustrated in Figs. 5 and 8, the guide roller 122 is located in one corner of the passageway 109. During a reciprocation of the carriage the roller 122 travels completely around the passageway 109 and returns to the position shown in Figs. 5 and 8.

In the forward movement of the carriage, the guide roller 122 travels from a position shown in Fig. 5 to an intermediate position shown in Fig. 4, and thence to a position shown in Fig. 3, the path of the roller being along guide walls 110 and 111 of the cam 108 (Fig. 12). While the guide roller 122 travels to the position shown in Fig. 4, the support 86 is shifted longitudinally of the rods 87 to compress the spring 88. Therefore, during the movement of the guide roller 122 from the position shown in Fig. 4 to the position shown in Fig. 3, the support 86 is shifted longitudinally in an opposite direction, and the compressed spring 88 will tend to drive the support in said last mentioned direction.

During the return movement of the carriage, the guide roller 122 moves in the passageway 109 from a position shown in Figs. 3 and 12, through an intermediate position, to the position shown in Fig. 5, the return path of the roller 122 being along guide walls 112 and 113 of the cam 108 (Figs. 12 and 13). In the travel of the guide roller 122 along guide walls 112 and 113, the support 86 controlled by said guide roller is shifted longitudinally in opposite directions and the spring 88' is compressed during one longitudinal movement so as to tend to drive the support in the other longitudinal movement.

To prevent retrograde movement of the roller 122 in the passageway 109 when it reaches either of the positions shown in Fig. 3, or 5, we have shown arms 127 pivoted at 126 adapted to extend into the passageway 109 and yieldingly engage stop members 128 (Figs. 12 to 15), said arms being yieldingly held in the positions shown in Fig. 12 by springs 129 secured at 130 to the cam housing 108 and to extensions 131 on the arms 127. The arms 127 are provided with depending stop flanges 132 to prevent retrograde movement of the guide roller 122 from the extreme positions shown in Figs. 3, 5 and 12.

The arms 127 are also provided with depending cam flanges 133 (Figs. 12 to 15) integral with said stop flanges 132, and adapted to be engaged by the roller 122 to shift the stop flanges 132 out of the passageway 109, as suggested in Fig. 13. The inner guide member 114, as shown in Figs. 13, 16 and 18, is provided with openings between the side walls 116 to receive the stop flanges 132 and cam flanges 133 when they are shifted out of the guide passageway 109. The side walls 116 of the inner guide member are notched at 134 to prevent the arms 127 from striking the side walls 116 when the stop flanges 132 enter the recesses between said walls.

It will be observed that the cam flanges 133 permit the guide roller 122 to freely pass the stop flanges 132 while traveling in the desired direction around the passageway 109, and after the roller 122 passes beyond the cam flanges, the springs 129 will shift the stop flanges 132 into the passageway 109 to prevent retrograde movement of the roller 122.

During the operation of the devices heretofore described, it will be observed that spaced bottles will be continuously transmitted by the conveyor 33 to positions nearly opposite to the correspondingly spaced receptacles 7 in the carrier of the pasteurizer, and the push bar 80 is actuated to shift a moving row of bottles from the conveyor in a direction toward said receptacles. When the bottles are discharged from the moving conveyor, a transfer device transmits the bottles to the receptacles 7 of the carrier.

The transfer device may include a loading table 135 (Figs. 2, 3, 7, 8 and 9) secured to an oscillating shaft 136 adapted to move the loading table from an approximately upright position (Fig. 7 and Fig. 8) where it receives bottles, to a horizontal discharge position. When the loading table 135 occupies said horizontal discharge position, loading fingers 138 fixed to an oscillatory shaft 139 are moved toward the carrier B to insert the bottles into the receptacles 7 of the carrier.

In Fig. 9, we have shown a cam 140 fixed to an end of the constantly rotating shaft 104. The cam 140 successively actuates the oscillatory shaft 136 for the loading table, and the shaft 139 for the loading fingers 138.

The means for actuating the loading table shaft 136 includes a bell crank lever 141 pivotally supported at 142 (Fig. 9), a roller 143 on one end of said lever 141 extending into a guide passageway 144 of the cam 140, and a link 145 pivotally connecting one end of said bell crank lever 141 to a short arm 146 on the shaft 136.

The mechanism for actuating the loading finger shaft 139 includes a lever 147 pivotally supported at 148, one end of said lever being provided with roller 149 extending into the passageway 144 of the cam 140 and the other end of said lever being pivotally connected by a rod 150 to an arm 151 on the shaft 139.

The operating shaft 45 is driven from the drive mechanism for the bottle-carrier B.

The shaft 14 which extends transversely of the pasteurizer housing A is driven near one end (Fig. 9) by the constantly rotating gear wheel 15 through which power is transmitted to drive the bottle carrier in a manner heretofore described. The shaft 14 at its other end (Fig. 7) is provided with a sprocket wheel 152 from which power is transmitted through a chain 153 to a sprocket wheel 154 fixed to one end of a shaft 155. The shaft 155 extends across the pasteurizer and is provided with a driving clutch member 156 slidably secured to the shaft 155, and a driven clutch member 157 loosely supported on the shaft 155, said driven clutch member having a hub 158 secured to the shaft 155 by a collar 159.

The driven clutch member 157 is provided with an integral sprocket wheel 160 adapted to transmit power through a chain 161 to a sprocket wheel 162 rotatably mounted on the operating shaft 45, said sprocket wheel 162 being adapted to transmit power to the operating shaft 45 through a driven member 163 slidably secured to said shaft.

We claim:

1. In a loading device for a machine having an entrance for a row of articles, a constantly moving conveyor for transmitting articles adjacent said entrance, a push bar movable in an oblique path across the conveyor to shift a row of articles toward said entrance, and means for guiding the push bar in said oblique path while advancing said push bar longitudinally of the conveyor at a speed conforming approximately to the speed of the conveyor, said means comprising a reciprocal carriage, a support for said push bar movable with said reciprocal carriage and slidably mounted thereon to provide for movement transversely of the path of the carriage, a guide member secured to said support, and a cam for directing said guide member in an oblique path during a movement of the reciprocal carriage.

2. In a loading device for a machine having a carrier provided with separated receptacles for rows of articles, a constantly traveling conveyor adapted to continuously transmit articles adjacent said carrier, a push bar movable in an approximately diamond-shaped path wherein said bar travels obliquely across the conveyor to shift a row of articles off of said conveyor and returns over the conveyor in a different oblique path, and means for guiding the push bar in its oblique paths while advancing said push bar longitudinally of the conveyor at a speed conforming approximately to the speed of the conveyor, said means comprising a carriage adapted to reciprocate at predetermined intervals, a support for said push bar movable with said reciprocal carriage and slidably mounted thereon to provide for movement in opposite directions longitudinally of the traveling conveyor, and a cam having an approximately diamond-shaped passageway, said support for the push bar being provided with a guide member extending into said diamond-shaped passageway so that said support will travel in a diamond-shaped path during reciprocal movements of said carriage thereby imparting a similar motion to the push bar.

3. In a loading device for a machine having a carrier provided with separated receptacles for rows of articles, a constantly traveling conveyor adapted to continuously transmit articles adjacent said carrier, a push bar which moves in an oblique path across the conveyor to shift a row of articles off of said conveyor and returns over the conveyor in a different oblique path, and means for guiding the push bar in its oblique paths while advancing said push bar longitudinally of the conveyor at a speed conforming approximately to the speed of the conveyor, said means comprising a carriage adapted to reciprocate at predetermined intervals, a support for said push bar movable with said reciprocal carriage and slidably mounted thereon to provide for movement in opposite directions longitudinally of the traveling conveyor, compression springs adapted to be alternately actuated during the movement of the support for the push bar and tending to reverse the movement of said support, a guide member secured to said support, and a cam for directing said guide member in oblique paths during the movements of said reciprocal carriage.

4. In a loading device for a machine having a carrier provided with separated receptacles for rows of articles, a constantly traveling conveyor adapted to continuously transmit articles adjacent said carrier, a push bar movable in an approximately diamond-shaped path wherein said bar travels obliquely across the conveyor to shift a row of articles off of said conveyor and returns over the conveyor in a different oblique path, and means for guiding the push bar during its oblique movements while advancing said push bar longitudinally of the conveyor at a speed conforming approximately to the speed of the conveyor, said means comprising a carriage adapted to reciprocate at predetermined intervals, a support for said push bar movable with said reciprocal carriage and slidably mounted thereon to provide for movement in opposite directions longitudinally of the traveling conveyor, compression springs adapted to be alternately actuated during the movement of the support for the push bar and tending to reverse the movement of said support, and a cam having an approximately diamond-shaped passageway, said support for the push bar being provided with a guide member extending into said diamond-shaped passageway so that said support will travel in a diamond-shaped path during reciprocal movements of said carriage thereby imparting a corresponding motion to the push bar, and said cam being provided with means to prevent retrograde movement of the guide member in said passageway during the reversal of the movements of the reciprocal carriage.

5. In a loading device for a machine having a carrier provided with separated receptacles for rows of articles, a constantly traveling conveyor adapted to continuously transmit articles adjacent said carrier, a push bar movable in an approximately diamond-shaped path wherein said bar travels obliquely across the conveyor to shift a row of articles off of said conveyor and returns over the conveyor in a different oblique path, and means for guiding the push bar in its oblique paths while advancing said push bar longitudinally of the conveyor at a speed conforming approximately to the speed of the conveyor, said means comprising a carriage adapted to reciprocate at predetermined intervals, a support for said push bar movable with said reciprocal carriage and slidably mounted thereon to provide for movement in opposite directions longitudinally of the traveling conveyor, compression springs adapted to be alternately actuated during the movement of the support for the push bar and tending to reverse the movement of said support, and a cam having an approximately diamond-shaped passageway, said support for the push bar being provided with a guide member extending into said diamond-shaped passageway so that said support will travel in a diamond-shaped path during reciprocal movements of said carriage thereby imparting a similar motion to the push bar, and said cam being provided with spring-actuated stop members in said diamond-shaped passageway to prevent retrograde movement of the guide member in said passageway during the reversal of the movements of the reciprocal carriage.

JAMES L. HEROLD.
FREDERICK W. WEHMILLER.